United States Patent [19]

Werth

[11] Patent Number: 4,818,989

[45] Date of Patent: Apr. 4, 1989

[54] SELECTIVE CALLING DECODER

[75] Inventor: Willard F. Werth, Cedar Rapids, Iowa

[73] Assignee: Rockwell International Corporation, El Segundo, Calif.

[21] Appl. No.: 593,792

[22] Filed: Mar. 27, 1984

[51] Int. Cl.[4] .................................................. H04Q 7/00
[52] U.S. Cl. ......................... 340/825.730; 340/825.74; 455/36
[58] Field of Search ....................... 340/825.71, 825.44, 340/825.48, 825.47, 825.73, 825.74; 455/37, 38, 36; 328/147, 141, 155, 167; 179/84 VF; 307/264, 521, 524

[56] References Cited

U.S. PATENT DOCUMENTS

| | | | |
|---|---|---|---|
| 3,487,367 | 12/1969 | Brown et al. | 340/825.48 |
| 3,539,829 | 11/1970 | Langendorf et al. | 307/524 |
| 3,604,947 | 9/1971 | Puthuff | 307/521 |
| 3,670,242 | 6/1972 | McGarvey | 340/825.48 |
| 3,673,343 | 6/1972 | Vosteen | 340/825.74 |
| 3,714,588 | 1/1973 | Deboo et al. | 328/167 |
| 3,747,108 | 7/1973 | Ringer | 340/825.74 |
| 3,882,545 | 5/1975 | Titus, IV | 307/524 |
| 3,978,416 | 8/1976 | Sutphin, Jr. | 307/521 |
| 3,997,797 | 12/1976 | Sahara et al. | 307/521 |
| 4,009,400 | 2/1977 | Harris et al. | 307/521 |
| 4,069,477 | 1/1978 | Maben | 340/825.48 |
| 4,072,931 | 2/1978 | Davis | 307/524 |
| 4,092,597 | 5/1978 | Place | 340/825.48 |
| 4,181,893 | 1/1980 | Ehmke | 340/825.48 |
| 4,323,881 | 4/1982 | Mori | 340/825.48 |
| 4,333,150 | 6/1982 | Matty et al. | 340/825.71 |
| 4,334,319 | 6/1982 | Gurry | 340/825.48 |
| 4,354,248 | 10/1982 | Conger et al. | 179/84 VF |
| 4,369,338 | 1/1983 | Soulliard | 179/84 VF |
| 4,370,650 | 1/1983 | Norrell | 340/825.71 |
| 4,370,753 | 1/1983 | Ehmke | 340/825.48 |
| 4,420,658 | 12/1983 | Loughlin | 307/524 |
| 4,443,783 | 4/1984 | Mitchell | 340/825.74 |
| 4,446,438 | 5/1984 | Chang et al. | 328/147 |
| 4,484,354 | 11/1984 | Bennett et al. | 340/825.44 |
| 4,502,049 | 2/1985 | Atkinson | 340/825.73 |
| 4,516,078 | 5/1985 | Yanagihara et al. | 328/167 |
| 4,569,072 | 2/1986 | van Roermund | 328/167 |

Primary Examiner—Salvatore Cangialosi
Attorney, Agent, or Firm—George A. Montanye; M. Lee Murrah; H. F. Hamann

[57] ABSTRACT

There is disclosed an aircraft selective calling decoder for decoding individual signal tones used in selectively signaling communication of a particular aircraft. The decoder is associated with a channel of receiving equipment in an aircraft and is responsive typically to a particular four-tone coded signal, the reception of which actuates the decoder indicating that an incoming communication is to be received. The decoder includes a dual path circuit which receives dual frequencies of each individual tone of the four-tone code and provides an output upon receipt of each tone for enabling the receiver following receipt of the proper four-tone code sequence. Filtering in each of the dual paths for each frequency of a tone is controlled by a microprocessor to eliminate the necessity for multiple individual filters.

1 Claim, 3 Drawing Sheets

SELECTIVE CALLING DECODER

BACKGROUND OF THE INVENTION

The present invention relates to decoding circuitry and techniques, and more particularly, to aircraft selective calling systems and decoders.

In the prior art, there are known selective calling systems in which the system is used to selectively signal a particular vehicle from another location. The calling system can be used in air-to-air or ground-to-air communication and is most typically established by the transmission of a coded multiple tone audio signal for use of by on-board radio receiver. The remote site from which communication with the vehicle is to be initiated, includes a tone source for selecting and transmitting the specific tone sequence which will advise the vehicle of the desired communication and the receiver aboard the vehicle includes a decoder for indicating when a coded tone sequence has been received.

In known systems, the selective calling equipment may have multiple channels, each installed to provide an automatic monitor of prospective communications. Each channel may include the decoder which is coupled to an associated receiver for response to a specific four-tone coded signal generated by the remote site. When the correct coded four-tone signal is received by the decoder, the decoder will provide an indication so that the presence of a transmitted communication is identified in that particular channel.

In such known systems, close spacings of the tone frequencies in the coded sequence and the requirement of the decoder to operate in the presence of electrical interference, requires the use of highly selective, frequency-stable filters for detecting the tone frequencies. In the past this requirement was met by using electromechanical resonators, such as vibrating reeds, tuning forks, or lumped-constant LC filters. Such systems, however, have many disadvantages in that the electromechanical embodiments are susceptible to mechanical excitation from host vehicle vibrations while the lumped-constant electrical resonators are physically large and require tuning to the specific frequency tones. For systems operating over wide temperature ranges, the Q stability can also be influenced to cause less than maximum system performance.

In certain aircraft selective calling systems, the same have been standardized and are operated on private corporate channels as well as in a world-wide communications network established by ARINC. When used in conventional aircraft, the decoder and associated circuits generally include the ability to provide sixteen selectable tones per channel, wherein each of the tones are derived by the use of active filters. As will be apparent, in multiple channel equipment, there is a necessity for sixteen filters in each channel which greatly increases the size, weight, and complexity of the selective calling system. Even in one channel, a need for the plurality of individual filters increases the cost and complexity of the single channel system and increases the likelihood of component failure because of the need for so many individual components forming the plurality of filters. As a result, there is still a need for the improvement in selective calling systems, and particularly in the decoding circuitry used to decode the multiple tone signals indicating the initiation of communication with a vehicle.

Accordingly, the present invention has been developed to overcome the shortcomings of the above known and similar techniques and to provide an improved selective calling system and decoder of reduced complexity and improved versatility.

SUMMARY OF THE INVENTION

In accordance with the present invention, a selective calling system and decoder includes a two-path circuit forming an individual channel for decoding a four-tone coded sequence. Each path includes a filter circuit under the control of a microprocessor which controls the filter frequency and the timing of frequency change to serially receive each tone of a four-tone coded sequence. The output of each filter in the two paths is coupled to individual logic circuits which have their outputs coupled to an AND-gate. The AND-gate provides an output upon receipt of two frequencies which form each of the tones of the coded sequence. Under the control of the microprocessor, each of the two frequencies are set as the filter frequency of one of the filters and those filter frequencies changed in appropriate sequence from one two-frequency tone to the next in accordance with the tone code. Following receipt of all four tones in the proper coded sequence by the microprocessor, the microprocessor indicates that a communication is about to be transmitted or unmutes the aircraft receiver and switches the receiver to a normal receive mode for reception of the transmission.

It is therefore a feature of the invention to provide a selective calling system of reduced complexity and capable of decoding a multiple tone coded signal.

It is another feature of the invention to provide a two-path decoding circuit having a filter in each path capable of selecting a plurality of frequencies.

Still another feature of the invention is to provide a selective calling decoder which provides decoding of a multiple tone sequence under the control of a microprocessor.

Yet another feature of the invention is to provide a decoding circuit for decoding dual frequency tones in each of a multiple tone sequence without the use of a plurality of individual filters.

Still a further feature of the invention is to provide a multiple channel selective calling system which can be implemented in each channel with two multiple frequency filters under microprocessor control.

Still another feature of the invention is to provide a selective calling decoder which is capable of uniformly detecting tones of a multiple tone coded signal with improved reliability over wide temperature ranges.

These and other advantages and novel features of the invention will become apparent from the following detailed description when considered with the accompanying drawings wherein:

DETAILED DESCRIPTION OF A PREFERRED EMBODIMENT

As was previously noted, there are known selective calling systems which employ multiple filters for sensing the coded tones. In particular, exemplary systems have been manufactured by the Motorola Company as evidenced by their models N1295A/NA137-714 and N1298A/NA138-714, described in their Component Maintenance Manual, Motorola part number 68P81023C60. In those particular embodiments of channel decoders, there is required a total of sixteen active filters per channel to enable the selection of sixteen tones per channel. As can be seen, the requirement for a plurality of filters to provide the selectable tones causes a significant increase in the decoding structure, especially when using multiple channels.

In order to reduce the complexity of such decoding apparatus and to provide for an increase in reliability and more predictable operation within a variety of environments, the present invention contemplates the use of a filter structure which is controlled by a microprocessor, although other equivalent control structures could be used. The microprocessor varies the frequency passed by the filter structure to thereby eliminate the need for multiple individual filters.

Figure 1:
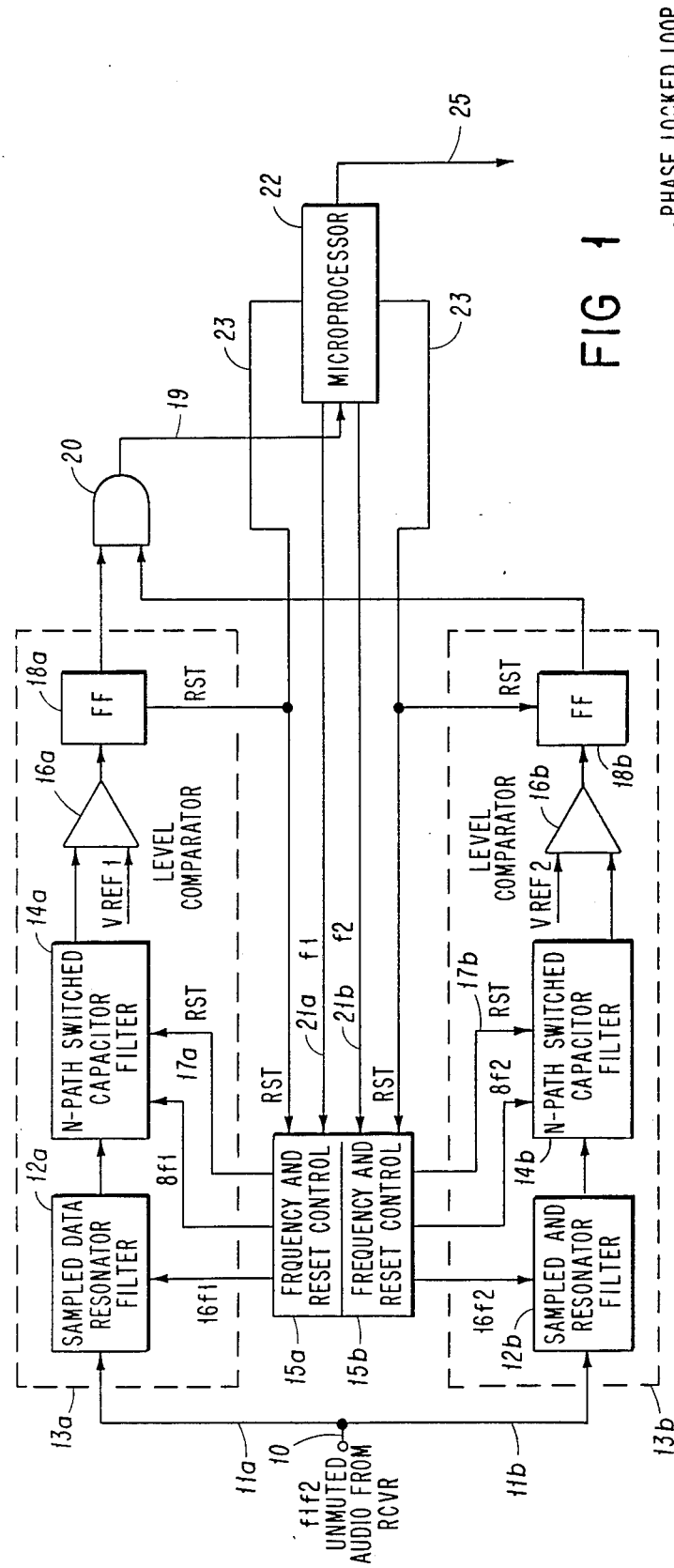
FIG. 1 is a schematic block diagram of the selective calling decoding circuitry and system in accordance with the present invention.

Referring now to the drawings, wherein like numerals are used to identify like elements throughout, there is shown in FIG. 1 a block diagram of the decoding circuitry of a selective calling system in accordance with the present invention. The decoding circuitry includes an input terminal 10 which is coupled to receive the unmuted audio signal from a receiver (e.g., an aircraft receiver receiving an audio modulated carrier frequency). This input 10 thus receives the tones which may be transmitted from a remote site in a coded sequence for indicating the initiation of a communication transmission from that site. For purposes of the present invention, the tones received at terminal 10 will be described with respect to the transmission of a four-tone sequence wherein each tone is formed by two frequencies f1 and f2. Each two frequency tone will be referred to hereinafter as a two-tone pair wherein four two-tone pairs are transmitted in a coded sequence to indicate the presence of an incoming message or communication to an aircraft.

The frequencies f1 and f2 of each tone are more particularly shown in FIG. 1. Those frequencies of each two-tone pair are coupled from terminal 10 to two paths over lines 11a and 11b respectively, and provided as input to circuits 13a and 13b of identical configuration. Since the circuits 13a and 13b have the same configuration and interconnection of elements, a description of the structure with respect to circuit 13a will suffice for an understanding of the same structure included in circuit 13b. More specifically, the elements 12a, 14a, 16a and 18a of circuit 13a are identical to the corresponding elements 12b, 14b, 16b and 18b of the circuit of 13b. The only exception is that the frequency detection provided by circuit 13a is for frequency f1, while the frequency detection provided by circuit 13b is for frequency f2 of the two-tone pair provided as input to terminal 10. The control of the circuits 13a and 13b to provide this discrimination will be explained in greater detail below.

Referring still to FIG. 1, the elements 12a, 12b are constructed as conventional sampled data resonator filters which are designed to provide bandpass filtering with respect to a particular center frequency. The sampled data resonator filter 12a, 12b may be constructed in a conventional manner as described in FIG. 7.2-7 on page 368 of the book entitled *Introduction to the Theory and Design of Active Filters* by L. P. Huelsman and P. E. Allen, McGraw Hill, 1980 (which publication is incorporated by reference herein). Such filters include switches which are controlled in their frequency of switching by the frequency and reset control 15a and 15b, respectively. In the present example, the clock frequency for filter 12a is 16f1, while the clock frequency for filter 12b is 16f2. Thus, by injecting a clock frequency at sixteen times the desired tone frequency, the response frequency of each filter 12a, 12b is positioned to one of the desired frequencies f1 and f2 for separating the tone pairs.

The filtered outputs from 12a and 12b are respectively coupled to N-path switched capacitor filters 14a and 14b, respectively. Such N-path switched capacitor filters may also be constructed in accordance with conventional techniques and circuitry in accordance with teachings of paragraph 5.6.3 (FIG. 5.20 fl, on page 5–17) of the publication entitled *Analog Switches and Their Applications,* published by Siliconix Company, June 1980 edition (which publication is incorporated by reference herein), relating to comb filters. Each of the filters 14a and 14b receive a clock input at 8f1 and 8f2, respectively, and also a reset input from the frequency and reset controls 15a and 15b.

The filters 14a and 14b operate as very selective high-Q resonant circuits. As is known, the circuit Q is controlled by the integration time of the capacitors. An integration time equal to sixty cycles of the tone frequency f1 or f2 provides a frequency response wide enough at the nose to pass the incoming tone including tone frequency tolerances and sharp enough at the skirts to reject the adjacent frequency tone. As is also known, N-path filters have a response to each harmonic of the incoming frequency except the clock frequency. Accordingly, the effect of the sampled data resonator filter 12a in filtering the frequency f1 is to reject the unwanted harmonics of the incoming frequency f1 prior to application of the f1 frequency to the N-path switched capacitor filter 14a for detection.

The output of the N-path switched capacitor filters 14a and 14b are provided respectively as one input to level comparators 16a and 16b. A second input to the level comparators 16a and 16b is coupled to receive a voltage reference $V_{REF1}$, $V_{REF2}$, respectively, against which the first input of the level comparator is compared. The level comparators thus indicate the receipt of the frequencies f1 or f2. In particular, when the frequencies f1 and f2 are provided to the input terminal 10 and filtered by elements 12a and 14a in circuit 13a the presence of frequency f1 in the path defined by circuit 13a will produce an output from the level comparator 16a which causes the comparator to change state from one logic level to another. Similarly, the presence of the frequency f2 at input terminal 10 and the path defined by circuit 13b, will cause the output level comparator 16b to change state from one logic level to another. This change of state will occur as soon as the tone represented by frequencies f1 and f2 causes a voltage at the first input of the respective level comparator 16a and 16b to exceed the decision threshold fixed by the voltage reference $V_{REF1}$, $V_{REF2}$ at the second input terminal of the respective comparators 16a and 16b.

The output of the level comparators 16a and 16b are coupled to flip-flops 18a and 18b, respectively, such that upon a change in state of the comparator output, the flip-flop will be set to provide a selected logic level at its output (in this case, a logic 1) which will be stored until resetting of the flip-flop. The resetting of flip-flops 18a and 18b is controlled by a microprocessor tone sequence control program as will be described in greater detail below. The flip-flops 18a and 18b are reset over lines 23 to begin detection and thereafter reset after the detection of each tone. The microprocessor also resets the frequency and reset controls 15a and 15b over line 23 upon the detection of a tone, also as will be described below.

The outputs of the respective flip-flops 18a and 18b are coupled as inputs to AND-gate 20 so that upon the receipt of a tone including the two frequencies f1 and f2 at input terminal 10, an output represented by a logic level 1 will be produced by the AND-gate 20 on line 19. This logic level 1 output from AND-gate 20 indicates that a valid tone (including frequencies f1 and f2) has been received at the terminal 10 and this indication is provided over line 19 to a microprocessor 22. This same decision is made for each tone in a coded sequence received by the decoder. The microprocessor 22 may be programmed by conventional techniques to detect the presence of each tone pair, and upon the receipt of a sequence of four pairs of correctly decoded tones, signal that a valid calling signal has been received. At this point, the microprocessor indicates over line 25 that an incoming message is present and unmutes the receiver of that particular channel so that the receiver can be switched to a normal receive mode.

The microprocessor 22 also controls timing of the decoder by providing a control frequency (f1 or f2) through lines 21a and 21b to frequency and reset controls 15a and 15b, respectively, which control frequency is used to generate the specific frequencies 8f1, 8f2, 16f1 and 16f2 necessary for clocking elements 12a, 12b, 14a and 14b. The microprocessor 22 is also constructed to provide a voltage reference to each of the level comparators 16a and 16b which may be accomplished by any conventional technique in which a digital representation of that voltage level entered in the microprocessor 22 is converted through a D/A converter to provide an analog voltage input $V_{REF1}$, $V_{REF2}$ to the respective level comparators 16a and 16b. Such voltage levels may be set by data read into the microprocessor or by toggle switches coupled to control the digital representation of the voltage within the microprocessor. Alternatively, the same voltage reference $V_{REF1}$ and $V_{REF2}$ could be provided by fixed or adjustable voltage supplies coupled to provide the proper voltage references to the level comparators 16a and 16b. The output 23 from the microprocessor 22 is then used to control the unmuting of the receiver and to switch the receiver to the normal receive mode in response to the receipt of a properly-coded sequence of four tones.

Figure 2:
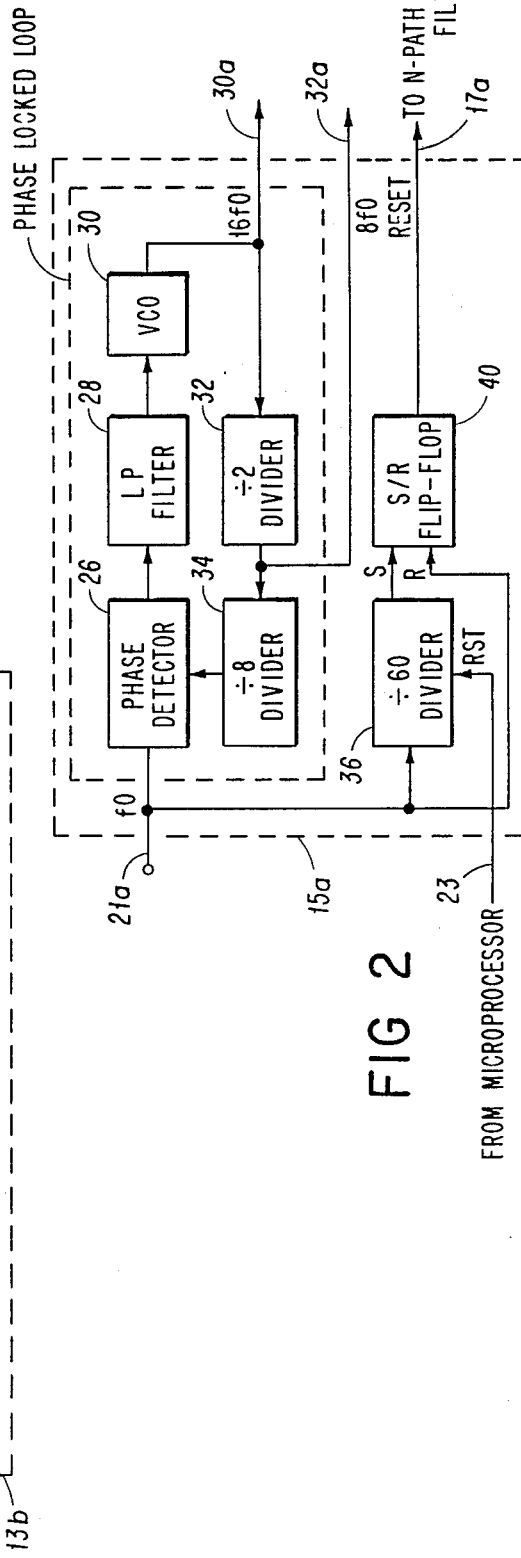
FIG. 2 is a schematic block diagram of the frequency and reset control set forth in FIG. 1.

Turning now to FIG. 2, there is shown a more detailed block diagram of those circuits which form the respective frequency and reset controls 15a and 15b. Again, for ease of illustration, a description of only one frequency and reset control (15a) will be made since the frequency and reset control 15b is identical in construction. As illustrated in FIG. 2, the input to circuit 15a includes a frequency of which may be produced by dividing the clock frequency of the microprocessor by a number N, where N is a positive integer controlled by the programming of the microprocessor. For a 1 MHz clock frequency of the microprocessor, the integer N needed to produce a corresponding frequency of is shown and described in connection with the table below. The control frequency of is set by the microprocessor 22 and provided over line 21a (21b for control 15b) as input to a conventional phase locked loop. In particular, the input from 21a is provided to the phase detector 26 having its output coupled through lowpass filter 28 to a voltage controlled oscillator 30. The output from the voltage controlled oscillator 30 is coupled as input to a divide-by-two divider 32 having its output coupled as input to a divide-by-eight divider 34. The output from the divide-by-eight divider 34 is in turn coupled as a second input to phase detector 26 in such a manner as to provide phase lock of the frequency output from the voltage controlled oscillator 30.

In the particular instance shown in FIG. 2, two outputs 30a and 32a are provided from the phase lock loop to provide an output of 16fo and 8fo, respectively, where fo generically represents one of the frequencies of each tone pair (e.g., f1 for control 15a and f2 for control 15b). Thus, in the particular example of FIG. 2, control 15a produces the 16f1 and 8f1 clock pulses applied to filters 12a and 14a by receiving frequency f1 over line 21a. In a similar manner, a corresponding frequency and reset control 15b provides an output of 16f2 and 8f2 for clocking the filters 12b and 14b by receiving frequency f2 over line 21b.

The frequency and reset control 15a also includes a divider 36 and a flip-flop 40 coupled such that the divider 36 receives input from the output of microprocessor 22 and provides its output to the set input of the set/reset flip-flop 40. The output from microprocessor 22 is also provided as input to the reset input of flip-flop 40. The output of the flip-flop 40 is then provided as the reset signal over line 17a to reset the N-path switched filter 14a.

As was previously mentioned, the integration time of the N-pass filter is controlled to equal 60 cycles of the tone frequency to provide a discrimination of that tone frequency. This integration time is detected by the divide-by-sixty divider 36 and in cooperation with the set/reset flip-flop 40 provides a logic 1 output for each 60 cycles of the tone frequency. Thus, the reset input over lines 17a and 17b to the filters 14a and 14b, respectively, allow integration for those 60 cycles before resetting the filter.

In order to obtain the appropriate detection of tones by the decoder, it will be appreciated that the particular frequency of the filters 12a, 12b and 14a, 14b are thus controlled by the integer N developed by the microprocessor by enabling the generation of the appropriate control frequency (f1 and f2) to control the output frequency of the frequency and reset control 15a, 15b used to clock those filters. Accordingly, the microprocessor 22 can be easily programmed to read or generate the required number N and set the appropriate frequencies to be filtered for each two frequency tone received at the input terminal 10 and automatically changed to sequence (in accordance with the proper code) those filter frequencies for each tone in the coded four-tone sequence. This may be accomplished under microprocessor control by toggle switches or input data which may be read to allow the microprocessor to develop the numbers N for setting the dual frequencies to be received for each of the four tones and which can be changed to provide any desired coded sequence.

Referring now to the table below, there is shown a series of frequencies which are normally generated in a selective calling system. The frequencies are generically designated as fo which, as previously mentioned, represents the transmitted frequency f1 or f2 of each two-tone pair. Adjacent the frequency in the table is the integer N which is required to produce that frequency fo so that the 16fo and 8fo clocking outputs can be attained. The values for the filter frequencies fo shown in the table and the integer N necessary to achieve those filter frequencies is based on the use of a 1 MHz clock frequency in the microprocessor 22.

TABLE 1

| fo (Hz) | N |
|---------|------|
| 312.6   | 3198 |
| 346.7   | 2884 |
| 384.6   | 2600 |
| 426.6   | 2344 |
| 473.2   | 2113 |
| 524.8   | 1905 |
| 582.1   | 1917 |
| 645.7   | 1548 |
| 716.1   | 1396 |
| 744.3   | 1258 |
| 881.0   | 1135 |
| 977.2   | 1023 |
| 1083.9  | 922  |
| 1202.3  | 831  |
| 1333.5  | 749  |
| 1479.1  | 676  |

It will be appreciated from the above table that there are sixteen frequencies which can be generated using the values for N located adjacent those frequencies. There are therefore sixteen frequencies that may be chosen for f1 or f2 of the tone pair. Thus, the filter frequency necessary to provide the appropriate filtering by filter 12a and 14a to thereby decode the tone can be easily set by fixing the frequency fo (by dividing clock by appropriate N) in the microprocessor 22 and providing that frequency over line 21a. The frequencies f1 and f2 can thus be easily changed for each two-frequency tone of the sequence in accordance with the desired code to be detected by the decoder. This may all be accomplished under the control of microprocessor 22 without the need for multiple filters in each path 11a and 11b. It can therefore be seen that although FIG. 1 only shows one channel, multiple channels receiving individual coded tone sequences could be constructed using the same circuitry shown in FIG. 1 for each channel. Since each channel would only require the dual path adjustable filters as disclosed, a substantial decrease in the number of components and filter structures necessary to decode a multiple tone sequence in a plurality of channels can be obtained.

Figure 3:
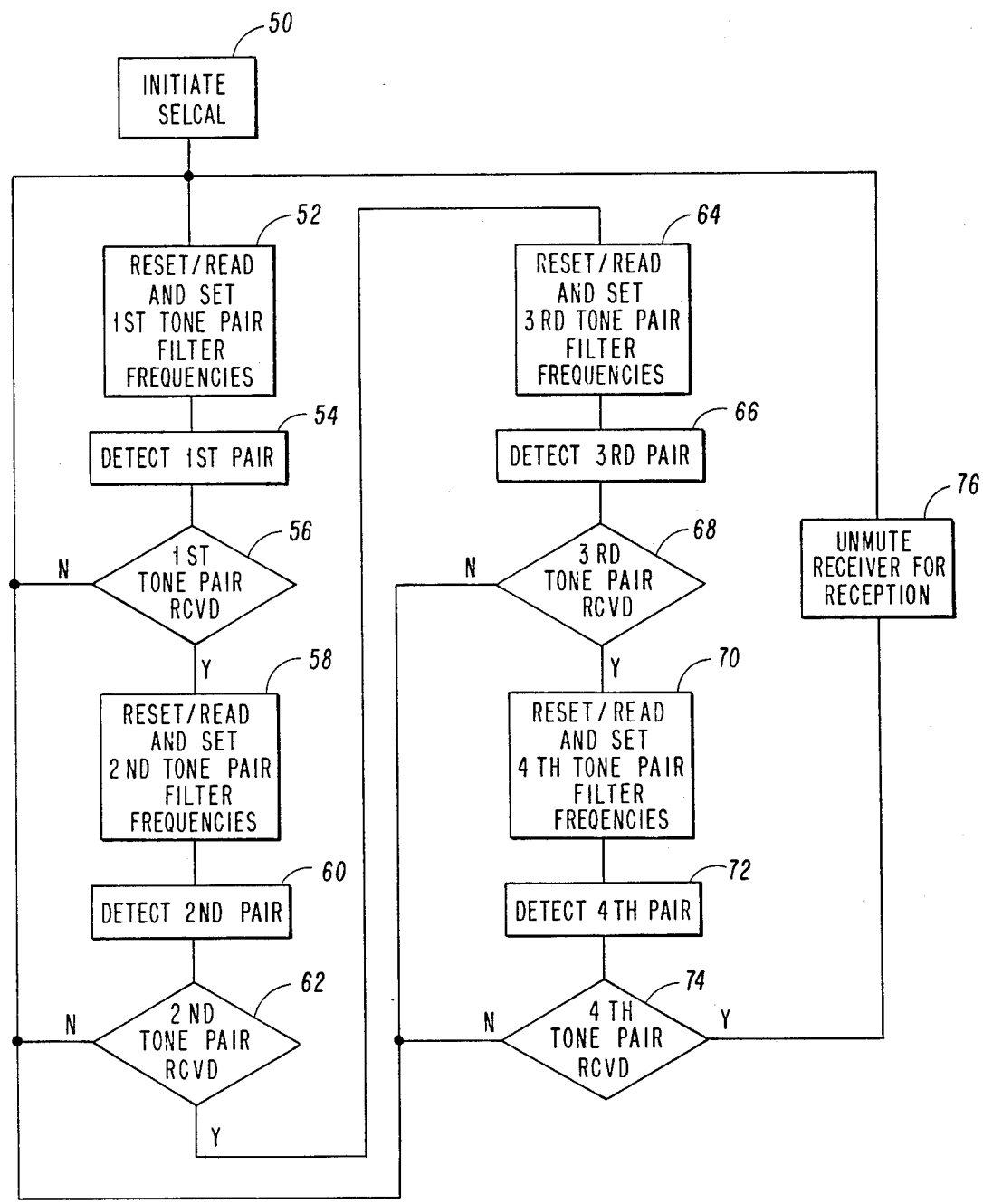
FIG. 3 is a flow diagram of the microprocessor control for decoding each of the tone pairs of a multiple tone coded signal.

Referring now to FIG. 3, there is shown a flow diagram which illustrates the programming and operation of the microprocessor 22 to control the decoding of a multiple tone selective calling signal. In the present instance, the same will be described with respect to a four-tone code having two frequencies defining each tone and designated as a tone pair. Block 50 indicates the selection of the selective call decoding feature wherein the microprocessor 22 receives a signal indicating that the selective calling feature has been selected. At this point, the microprocessor reads, for example, toggle switches or data which are set to provide a digital representation of each of the frequencies of the first tone pair in block 52. In response to this, the microprocessor 22 divides its clock by the appropriate integer N to provide the fo (f1 or f2) frequency over each line 21a and 21b for the frequency and reset controls 15a and 15b to produce the clock frequencies 8f1, 16f1 and 8f2, 16f2. At the same time the microprocessor 22 resets the flip-flops 18a and 18b and divider 36 in each control 15a and 15b. After a preset interval, the microprocessor 22 detects the output of AND-gate 20 at block 54 to determine if the first tone has been received. In block 56, if the first tone pair has not been received as evidenced by the output of AND-gate 20, the microprocessor loops back through blocks 52 and 54 to again cause circuit reset and read, set and detection of the first tone pair. This occurs until the first tone pair is received.

Thereafter, in block 58, the microprocessor resets 18a, 18b, and 36 and reads the digital representations of the frequencies of the second tone pair in the four-tone sequence and sets the integer N to provide the appropriate clocking signals to the filters to detect the frequencies of the second tone. In block 60, the output from AND-gate 20 is detected to determine if the appropriate frequency pair of the second tone has been received to define the second tone in the four tone sequence. In block 62, if the appropriate second tone pair has not been received, the microprocessor loops back to block 52 to begin the detection of the tone sequence again.

If the second tone pair in the sequence has been detected, then the same reset, reading and setting of the third tone pair by the microprocessor is performed in block 64 as was performed in blocks 52 and 58. In block 66, the detection of the third tone pair is made and if, in block 68, the proper third tone has not been received as evidenced by the output of AND-gate 20, the program loops back to begin again the detection of the tone sequence in block 52. If the appropriate third tone has been received, the appropriate reset occurs and the frequencies of the fourth tone pair are read and set in block 70 in the same manner as in blocks 52, 58 and 64. Likewise, the fourth tone pair is detected at 72 by the output at 20 and if the fourth tone is not received, the program loops back to the beginning block 52 to again attempt to read a sequence of four tones. If the fourth tone is received in block 64, the microprocessor causes the receiver to be unmuted and to be placed in a condition for receiving the impending message.

In view of the above, it will be appreciated that through the use of toggle switches or input data programming, the correct frequency pair for each tone in the four-tone sequence can be preset and cycled in the proper code sequence and this code sequentially tested to detect transmitted tone pairs until a proper coded sequence of four-tone pairs is received. It will thus be appreciated that the coding sequence can be easily changed by modification of the input data by programming and/or alteration of the toggle switches to thereby enable multiple codes to be selected in each of a plurality of channels, with less complexity than the multiple filter embodiments known in the prior art.

Figure 4:
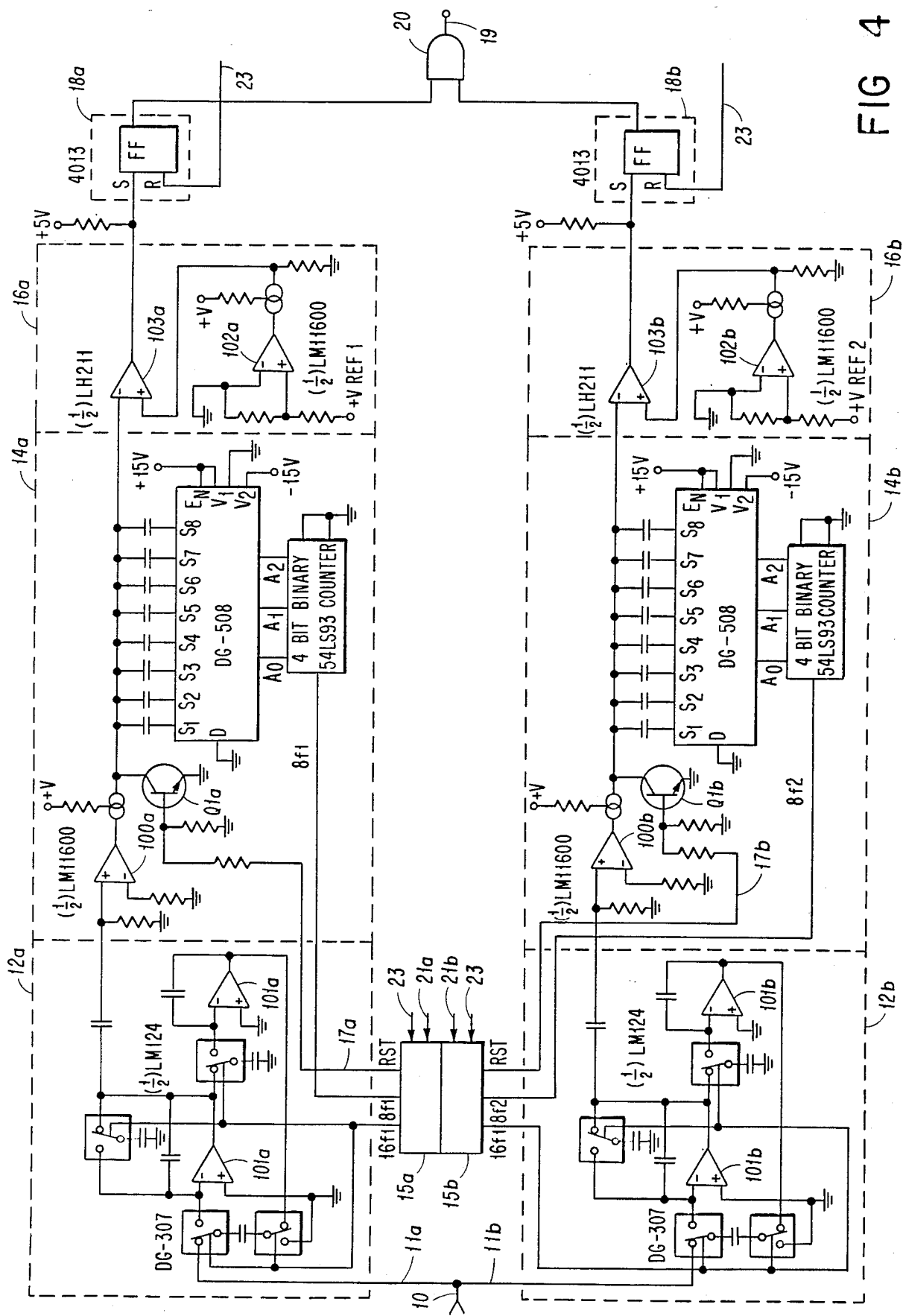
FIG. 4 is a detailed schematic diagram of the circuitry forming the system of FIG. 1.

Although it is believed that the above description is of sufficient detail to understand the invention, there is shown in FIG. 4 a detailed schematic diagram of the circuits and interconnections which may be used to implement the block diagram of FIG. 1. Each of the elements and components are implemented as specified in the diagram with the particularly identified circuits being exemplary of those which will accomplish the desired operation. Again, the elements of each of the dual paths defined by 11a and 11b, include identical detailed structure which is generally formed by one half of an integrated circuit component in accordance with the labels noted in FIG. 4. It will be additionally appreciated, that the values for resistance and capacitance can be easily fixed in accordance with the described operation and the requirements of the particular circuit elements defined in the detailed schematic diagrams and such would be apparent to one of ordinary skill in the art.

Referring again to FIG. 4, the sampled data resonator filters 12a and 12b receive the input from terminal 10 to filter those frequencies f1 and f2 on paths 11a and 11b, respectively. The sampled data resonator filters 12a and 12b include the well-known filters depicted on the aforementioned page 368, FIG. 7.2–7 of *Introduction to the Theory and Design of Active Filters*. The switches are formed by DG-307 control switches while the operational amplifiers 101a and 101b are formed by use of one-half of an LM124 circuit. The negative and positive inputs and the coupling of the capacitors and resistors with respect to each of those operational amplifiers is as detailed in the FIG. 4.

The output from each of the sampled data resonator filters is provided through a capacitor to the positive input of a transconductance generator 100a, 100b in the N-path switched capacitor filter 14a, 14b, respectively. The output of the transconductance current generator 100a, 100b is coupled to the collector of an associated transistor Q1a, Q1b, respectively, and to the common terminals of the N capacitors in the N-path filter. The N-path filter DG508 includes the capacitors connected to the S1–S8 outputs which are charged by the output from the generator 100a or 100b. The charging is controlled by the clocking of a four-bit binary counter 54LS93 driven by the 8f1, 8f2 frequency output of the frequency and reset control 15a or 15b. The switching of the sampled resonator filter is controlled by the 16f1, 16f2 frequency outputs from those same frequency and reset controls 15a and 15b, respectively.

The outputs of the N-path switched capacitor filters 14a and 14b are in turn coupled to the negative input of an operational amplifier 103a, 103b respectively, of the level comparator 16a, 16b, respectively. The positive input of 103a and 103b is coupled to receive voltage levels controlled by transconductance generators 102a, 102b, respectively. The positive input of each generator 102a, 102b is coupled as shown to receive the voltage references $V_{REF1}$ and $V_{REF2}$, respectively. As was described above, each of these voltage references establishes when the frequencies f1 and f2 have been detected by the change of output state of level comparators 16a and 16b in response to the capacitor charge exceeding the respective voltage input threshold at the positive input to 103a and 103b.

In connection with the level comparators 16a and 16b, it should be noted that the transconductance generators 100a and 102a are each formed by using one-half of he same LM11600. The purpose of using one-half of the same element is to provide temperature compensation for the charging of the capacitors of the DG508. In this manner, the filtering characteristics of the N-path switched capacitor filter, which may be dependent upon temperature because of the current delivered to charge the capacitors, will be exactly compensated by the same effect due to the temperature adjustment in the voltage reference $V_{REF1}$. Likewise, the transconductance generators 100b and 102b are each implemented by use of one-half of the same LM11600, so that the same temperature compensation takes place in the second path in connection with the operation of N-path switched capacitor filter 14b and level comparator 16b.

This particular feature provides improved accuracy of the selective calling signal decoder by making the filtering characteristics of filters 14a and 14b substantially independent of the temperature changes of the circuits.

The output of the operational amplifiers 103a and 103b are coupled to the input of their respective flip-flops 18a and 18b, each formed by a 4013 component. The output of the flip-flops 18a and 18b are in turn coupled as the two inputs to AND-gate 20 which, in turn, provides its output to the microprocessor 22. When the flip-flop outputs from 18a and 18b have been set at a logic level 1 by the input to terminal 10, the same provides a logic level 1 output at 19 which indicates that the two frequencies f1 and f2 defining the tone received at terminal 10 are the same frequencies set by the microprocessor in accordance with the proper tone code.

As was described with respect to FIGS. 1 and 2, the reset output from the frequency and reset controls 15a and 15b are respectively coupled to the base of transistors Q1a and Q1b. Accordingly, the charge on the capacitors of N-path filters 14a and 14b is shorted to ground after each 60 cycles of the clock frequency or with the reset of the flip-flops 18a and 18b under microprocessor control. This allows effective control of the charge times of the N-path filters so that the f1 and f2 frequencies can be accurately detected. This switching is provided to enable the appropriate filter response at the desired frequency following filtering in the sampled data resonator filters 12a and 12b.

Following discharge of the capacitors and reset of the flip-flops 18a and 18b, the input 10 may then receive the next tone and each successive tone in the four tone sequence in accordance with the direction of microprocessor 22. Thus, during each sampling period of a four-tone coded sequence, the output 19 for each received tone will provide a logic 1 when the tones are received in accordance with the coded order set by the microprocessor 22. The microprocessor detection of four successive logic 1's at output 19 will therefore indicate that the correct four-tone coded sequence has been received, and in accordance with the flow diagram of FIG. 3, will set the receiver to receive an incoming message.

As will be appreciated from the above description, the present invention enables the implementation of a selective call signal decoding system without the use of multiple independent filters and which may be implemented by simple microprocessor control and yet be responsive to wide temperature changes. The system may be constructed as a single channel decoder with substantially less complexity over prior known systems while providing substantially increased versatility, and may also be constructed to provide multiple channels with the same proportional benefits for each channel so employed. These are features which are not taught or suggested by any of the prior art.

Obviously, many other modifications and variations of the invention are possible in light of the above teachings. By way of example, it will be apparent that the control exercised by the microprocessor could be implemented by discrete logic elements exercising the same control or by other equivalent analog or digital circuits performing that same control function. It is therefore to be understood that within the scope of the appended claims, the invention may be practiced otherwise than as specifically described.

What is claimed is:

1. A decoding system comprising:
   means for receiving an electrical input which may include at least one frequency representing a tone signal;
   a sampled data resonator filter coupled to receive said electrical input and controlled to have a center frequency equal to said at least one frequency when that frequency is present in said electrical input;
   an N-path switched capacitor filter having an input coupled to receive the output of sampled data resonator filter and controlled to provide an output at said at least one frequency when said frequency is present in said electrical input;
   means responsive to said output of a selected filter frequency for detecting the presence of that frequency;
   a microprocessor for alterably generating a control frequency; and
   a frequency and reset control coupled to receive the control frequency to provide a clocking frequency to said sampled data resonator and said N-path switched capacitor for alterably setting said selected frequency at said at least one frequency, said frequency and reset control comprising:
   a phase detector having a first input coupled to receive said control frequency, a second input, and an output;
   a low pass filter having an input coupled to receive the output of said phase detector and provide an output;
   a voltage controlled oscillator having an input coupled to receive the output of said low pass filter and providing a variable frequency output in response to the input of said voltage controlled oscillator;
   a divide-by-2 divider having an input coupled to receive the output of said voltage controlled oscillator and providing a divided output;
   a divide-by-8 divider having an input coupled to receive the output of said divide-by-2 divider and having an output coupled to the second input of said phase detector to form a phase locked loop;
   a divide-by-60 divider having an input coupled to receive said control frequency and providing an output; and
   a set/reset flip-flop having a set input and a reset input and providing an output, said set input of said flip-flop being coupled to receive the output of said divide-by-60 divider and said reset input of said flip-flop being coupled to receive said control frequency.

* * * * *